United States Patent
Becker-Roβ et al.

(10) Patent No.: US 8,681,329 B2
(45) Date of Patent: Mar. 25, 2014

(54) ECHELLE SPECTROMETER ARRANGEMENT USING INTERNAL PREDISPERSION

(75) Inventors: Helmut Becker-Roβ, Berlin (DE); Stefan Florek, Berlin (DE); Michael Okruss, Postdam (DE)

(73) Assignee: Leibniz-Institut Fur Analytische Wissenschaften—Isas—E.V., Dortmuund (DE)

( * ) Notice: Subject to any disclaimer, the term of this patent is extended or adjusted under 35 U.S.C. 154(b) by 288 days.

(21) Appl. No.: 13/147,190

(22) PCT Filed: Jan. 25, 2010

(86) PCT No.: PCT/EP2010/050774
§ 371 (c)(1),
(2), (4) Date: Jul. 29, 2011

(87) PCT Pub. No.: WO2010/086283
PCT Pub. Date: Aug. 5, 2010

(65) Prior Publication Data
US 2011/0285993 A1    Nov. 24, 2011

(30) Foreign Application Priority Data
Jan. 30, 2009   (DE) .......................... 10 2009 003 413

(51) Int. Cl.
*G01J 3/28*   (2006.01)

(52) U.S. Cl.
USPC .......................................... 356/326; 356/328

(58) Field of Classification Search
USPC .................................. 356/300, 326, 328, 330
See application file for complete search history.

(56) References Cited

U.S. PATENT DOCUMENTS

| 3,922,089 A | 11/1975 | Danielsson et al. |
| 5,189,486 A | 2/1993 | Florek et al. |

(Continued)

FOREIGN PATENT DOCUMENTS

| DD | 292078 A5 | 7/1991 |
| DE | 4021159 A1 | 1/1991 |

(Continued)

OTHER PUBLICATIONS

Levy et al; A Photodiode Array Based Spectrometer System for Inductively Coupled Plasma-Atomic Emission Spectrometry; Spectrohimica Acta; 1987; pp. 341-351; vol. 42B, No. 1 and 2.

(Continued)

*Primary Examiner* — Tara S Pajoohi Gomez
(74) *Attorney, Agent, or Firm* — Thorpe North & Western LLP

(57) ABSTRACT

An Echelle spectrometer arrangement (10) with internal order separation contains an Echelle grating (34) and a dispersing element (38) for order separation so that a two-dimensional spectrum having a plurality of separate orders (56) can be generated, an imagine optical system (18, 22, 28, 46), a flat-panel detector (16), and predispersion means (20) for predispersing the radiation into the direction of traverse dispersion of the dispersion element (38). The arrangement is characterized in that the predispersion means (20) comprise a predispersion element which is arranged along the optical path behind the inlet spacing (12) inside the spectrometer arrangement. The imaging optical system is designed in such a manner that the predispersed radiation can be imaged onto an additional image plane (24) which does not have any boundaries in the predispersion direction and which is arranged along the optical path between the predispersion element (20) and the echelle grating (34). Optical means (20, 68) in the area of the predispersed spectrum are arranged to influence the spatial and/or the spectral beam density distribution on the detector (16).

13 Claims, 6 Drawing Sheets

(56) References Cited

U.S. PATENT DOCUMENTS

| | | | |
|---|---|---|---|
| 5,565,983 A * | 10/1996 | Barnard | 356/328 |
| 5,859,702 A | 1/1999 | Lindblom | |
| 7,804,593 B2 | 9/2010 | Becker-Roβ et al. | |
| 2002/0180970 A1 | 12/2002 | Hammer et al. | |
| 2005/0157293 A1 | 7/2005 | Florek et al. | |
| 2008/0106735 A1 | 5/2008 | Becker-Ross et al. | |

FOREIGN PATENT DOCUMENTS

| WO | WO 01/61292 A1 | 8/2001 |
|---|---|---|
| WO | WO 03075050 | 9/2003 |

OTHER PUBLICATIONS

PCT Application PCT/EP2010/050774; filed Jan. 25, 2010; Helmut Becker-Ross; International Search Report mailed Sep. 24, 2010.

\* cited by examiner

ECHELLE SPECTROMETER ARRANGEMENT USING INTERNAL PREDISPERSION

TECHNICAL FIELD

The invention relates to an Echelle spectrometer assembly with internal separation of the orders, comprising
(a) an Echelle grating for the spectral separation of radiation in a main dispersion direction,
(b) a dispersing element for the separation of the orders by means of the spectral separation of the radiation in a lateral dispersion direction forming an angle with the main dispersion direction of the Echelle grating such that a two-dimensional spectrum with a plurality of separated orders is generated,
(c) an imaging optical assembly for imaging the radiation entering into the spectrometer assembly through an entrance slit in an image plane, and
(d) a detector having a two-dimensional arrangement of a plurality of detector elements in the image plane, and
(e) predispersion means for predispersion of radiation in the direction of the lateral dispersion of the dispersing element.

In an Echelle spectrometer, gratings are used which have a stairs-shaped (Echelle (French=stairs) cross section. By the stepped structure with a suitable Blaze angle a diffraction pattern is generated which concentrates the diffracted intensity in high orders, for example, in the fiftieth to one hundredth order. Thereby, high spectral resolutions can be achieved with a compact assembly. The orders can overlap depending on the incident wavelengths. In Echelle spectrometers with internal separation of the orders the orders are, therefore, dispersed again in a direction lateral to the dispersion direction of the Echelle grating in order to separate the different occurring orders. In such a way a two-dimensional spectrum is obtained which can be detected with a plane detector.

An Echelle spectrometer with internal separation of the orders must be distinguished from Echelle spectrometers with external separation of the orders in so far as only radiation of a small spectral range enters the spectrometer with external separation of the orders. In Echelle spectrometers with internal separation of the orders the spectrum is generated in the form of a two-dimensional structure on the detector. This structure consists of spectral sections having the size of one free spectral range which are essentially parallel. The use of a two dimensional detector with a plurality of detector elements enables the simultaneous detection of a large wavelength range with high resolution.

The lateral dispersion is generally selected large enough to completely separate the orders in all ranges. In order to ensure this over the entire spectral range there are spectral ranges where there is an unused space between the individual orders. Using a prism for the lateral dispersion will cause larger spaces in the short wavelength range due to its higher dispersion than in the longer wavelength range.

It is a disadvantage of known assemblies that detectors must be very large if large spectral ranges are to be detected with high resolution and a sufficient light throughput. Furthermore, problems can occur if the radiation source emits different spectral intensities. For example, some radiation sources entirely cover the spectral range between 193 nm and 852 nm which is very important in spectroscopy. However, the intensity in the range above 350 nm is often higher than in the short wavelength range at 200 nm by several orders of magnitude. Common detectors do not have a sufficient dynamic range so that the spectral ranges can only be simultaneously detected if the sensitivity is compromised. Otherwise, the ranges are detected separately with different illumination times.

PRIOR ART

DD 292078 discloses an assembly where the spaces between the orders are used. The spectrometer is provided with an assembly for predispersing the radiation entering the spectrometer. This assembly is provided outside the actual spectrometer. The radiation is predispersed with a prism having a small prism angle. Furthermore, the height of the entrance slit is selected corresponding to the maximum width of a space between two orders in the short wavelength range. With a suitable illumination of the entrance slit, only the short wavelength radiation can completely enter the spectrometer. The radiation of the longer wavelength range can only partly pass the entrance slit due to the predispersion. Thereby, a smaller entrance slit width is effective in ranges where the separation of the orders is less. In such a way the signal-to-noise ratio is improved in the short wavelength range where there is generally less intensity by adding up the intensity of several detector elements of the detector. The radiation incident on each individual detector element, however, remains the same. The illumination density on each detector element is practically not changed with such an assembly. In the assembly the detector size is completely used, the size of the detector for detecting the entire spectrum, however, remains the same.

Furthermore, an assembly is known which aims at a better use of the detector surface by a more even lateral dispersion over the entire spectral range. This more even lateral dispersion is achieved by effecting the lateral dispersion with two opposite prisms of a different material. The dispersion is determined from the difference of the dispersions of the two materials. Large prism angles must be used in order to obtain a sufficiently large difference. Accordingly, high transmission losses occur with a simultaneously small resulting dispersion.

DE 10 2004 028 001 A1 describes an assembly enabling the use of commercially available small detectors. The assembly uses a further Echelle spectrometer with an additional imaging optical assembly. Each of the two spectrometers is optimized regarding a wavelength region. The measurement of radiation is carried out by dividing the wavelength ranges and measuring separately in time. The short wavelength range which generally has less intensity is measured in a first measurement and the more intensive long wavelength range is measured in a second measurement with the other spectrometer. Both spectrometers use the same detector which may be smaller with such an assembly as it does not have to detect the entire spectrum.

Gilbert M. Levy, Alexander Quaglia, Robert E. Lazure and Scott W. McGeorge describe in Spectrochimica Acta, Vo. 42.B (1987) P. 341-351 a spectrometer assembly with an Echelle spectrometer with predispersion. The assembly uses a grating for predispersion. A mask is provided in the plane of the spectrum generated in such a way selectively baffling spectral ranges which are not used. The remaining spectral ranges are dispersed with an Echelle spectrometer in the same direction and diverted to a one-dimensional detector.

DE 2 312 777 discloses an assembly with an Echelle spectrometer with internal separation of the orders. The entire spectrum is imaged onto a detector. The dispersion assembly provided for the lateral dispersion comprises a prism and a dispersion grating arranged immediately therebehind. The dispersion of the prism and the dispersion of the grating are selected in such a way that the orders appear on the detector with essentially equidistant spaces.

DISCLOSURE OF THE INVENTION

It is an object of the invention to provide an Echelle spectrometer assembly of the above mentioned kind enabling the measurement of spectra with a large spectral range and strongly varying intensities with commercially available detectors.

According to an aspect of the invention (f) the predispersion means comprise a predispersing element, which is arranged along the optical path behind the entrance slit inside the spectrometer assembly, (g) the imaging optical assembly is designed in such a way that the predispersed radiation is imaged to an additional image plane which is free of limitations, the image plane being arranged along the optical path between the predispersing element and the Echelle grating, and (h) optical means are provided in the place of the predispersed spectrum for manipulating the spatial and/or spectral radiation density distribution on the detector.

The additional, predispersed spectrum does not require a high resolution. It can be generated with known dispersion means. Two mirrors can be used for the imaging optical assembly which have only small reflection losses over the entire spectral range. The spectrum can be generated with a plane grating. An additional slit is not required. The additional spectrum is free of limitations at least in the predispersing direction. Contrary to mechanical means, such as a mask or a slit, the predispersed spectrum can be individually manipulated with optical means. Absolutely, the predispersion is preferably directed in the same direction as the lateral dispersion.

Optical means can be means for reducing the intensity of the predispersed radiation in the additional image plane depending on the spatial position. The means for reducing the intensity of the predispersed radiation depending on the spatial position may be formed by a grey filter having a spatially variable transmission in the additional image plane. The transmission can vary along the spectrum in such a way that the dynamic range of the detector elements is optimally used. In ranges where the intensity is weak, radiation is completely transmitted. In ranges with high intensity, the radiation is largely reduced. Contrary to the use of baffles, there is no spatial limitation of individual radiation bundles. Furthermore, the entire wavelength range of the spectrum is transmitted.

In a particularly preferred modification of the invention, the reduction of the intensity is adapted to the spectral distribution of the transmission and the reflectivity of the imaging optical assembly, the Echelle grating, the dispersing elements, the spectral distribution of the intensity of a radiation source and/or the spectral distribution of the quantum effectivity of the detector in such a way that the intensity spectrum generated by a radiation source on the detector is essentially even.

In a further modification of the invention, the predispersing element is a grating. Preferably, the dispersing element is a prism and the grating line number of the predispersing grating is adapted to the dispersion of the prism in such a way that the orders imaged onto the detector appear essentially with even distances. In other words: the predispersed spectrum is manipulated by the selection of the grating line number and the focus of the predispersing imaging optical assembly in such a way that it essentially compensates the distribution resulting from the lateral dispersion and the predispersion and the distribution of the free spectral ranges of the Echelle grating which is proportional to the square of the wavelength. The selection of such suitable optical means results in essentially equidistant spaces between the orders and thereby the optimum use of the detector surface.

An order filter can be positioned in the additional image plane as an optical means for reducing the intensity depending on its spatial position, the order filter masking higher orders of a predispersion grating.

Alternatively the predispersing means can comprise an additional prism having a roof edge which is positioned in such a way that the prism dispersion runs parallel to the main dispersion direction of the Echelle grating and the predispersing means comprise a baffle for suppressing higher orders of the predispersing grating. The higher diffraction orders of the predispersing means are thereby separated from the spectrum in the first order and can be masked or suppressed by, for example, a baffle or the like. Thereby, only radiation of preferably the first or another selected order of the predispersing grating falls on the detector.

Obviously, the optical means for manipulating the predispersed spectrum can be combined. The predispersion can be effected with a grating in order to enable the use of a small detector and at the same time a greyfilter may be used to account for the dynamic range of the detector. It is important that the additional spectrum provides the possibility of the selective manipulation of the photon number incident on the individual illuminated detector pixel per time unit. Contrary to the use of entirely absorbing blinds or baffles, interim values are possible which are quasi continuously accessible.

The described spectrometer assembly can have a radiation source with a continuous spectrum between 190 nm and 860 nm, especially a Xe-high pressure short arc lamp. It is particularly suitable for atomic absorption spectroscopy (AAS).

DETAILED DESCRIPTION OF AN EMBODIMENT OF THE INVENTION

Figure 1:
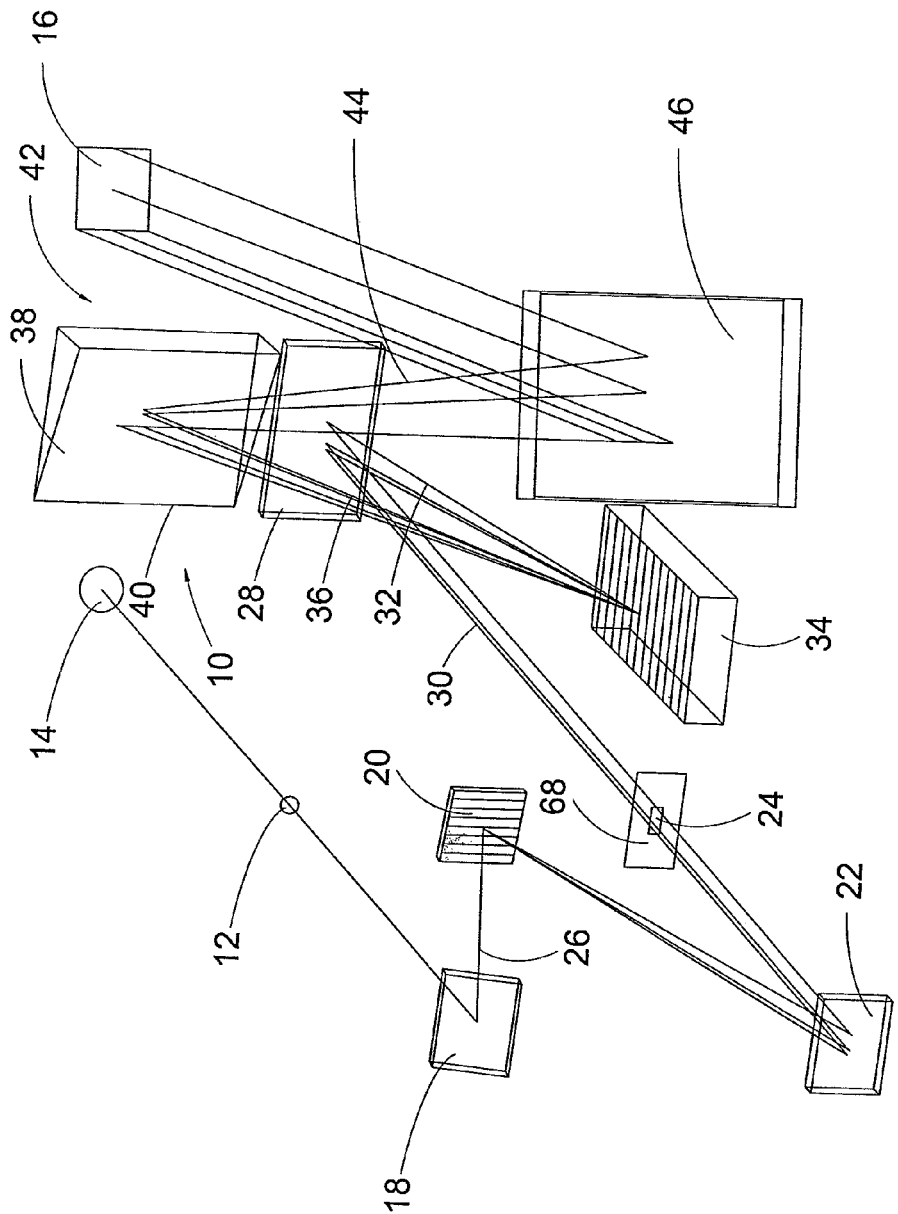
FIG. 1 is a schematic view of an Echelle spectrometer assembly where the radiation of a radiation source is predispersed.

FIG. 1 shows an Echelle spectrometer assembly generally denoted with numeral 10. The Echelle spectrometer assembly 10 is provided with an entrance slit 12. The entrance slit 12 is illuminated by radiation from a radiation source 14. Such a radiation source is, for example, a Xenon short arc high pressure lamp or a deuterium emitter as it is used in atomic absorption spectroscopy. Alternatively, the radiation emitted by an emission source, such as, for example, an inductively coupled plasma (ICP) can be imaged on the entrance slit.

The width and the height of the entrance slit 12 are adapted to the width and the height of the detector elements of a detector 16. A predispersing imaging optical assembly with a collimator mirror 18 and a camera mirror 22 image the entrance slit 12 to an image plane 24. A plane grating 20 is arranged between the collimator mirror 18 and the camera mirror 22. The plane grating 20 serves to predisperse the incident parallel radiation 26 coming from the collimator mirror 18. Instead of the described predispersing imaging optical assembly a curved imaging grating is also suitable.

A linear spectrum with a spatial extension of about 12 mm over the spectral range between 190 nm and 860 nm is generated in the image plane 24. This predispersed radiation falls on a further collimator mirror of the imaging optical assembly which is denoted with numeral 28 in FIG. 1. This is represented by beams 30.

The parallel radiation 32 reflected by the collimator mirror 28 falls on an Echelle grating 34. At the Echelle grating 34 the radiation 32 is dispersed in high order perpendicular to the dispersion direction of the predispersion of the grating 20. The dispersed radiation 36 is reflected from the Echelle grating 34 in known manner in the direction of a quartz prism 38. The roof edge 40 of the quartz prism 38 is directed in such a way that the lateral dispersion of the quartz prism is perpendicular to the dispersion direction of the Echelle grating 34 and parallel to the dispersion direction of the plane grating 20, while the dispersions of the plane grating and the quartz prism are added. The quartz prism 38 is reflective on its backside 42. Thereby, the incident radiation 36 is reflected towards a camera mirror of the imaging optical assembly 46 after doubly passing the prism 38. This is represented by a beam 44. The camera mirror 46 images the radiation on the detector 16. The detector 16 is a commercially available Charge-Coupled-Device (CCD)-Detector having a high sensitivity in the spectral wavelength range between 190 nm and 860 nm.

Figure 2:
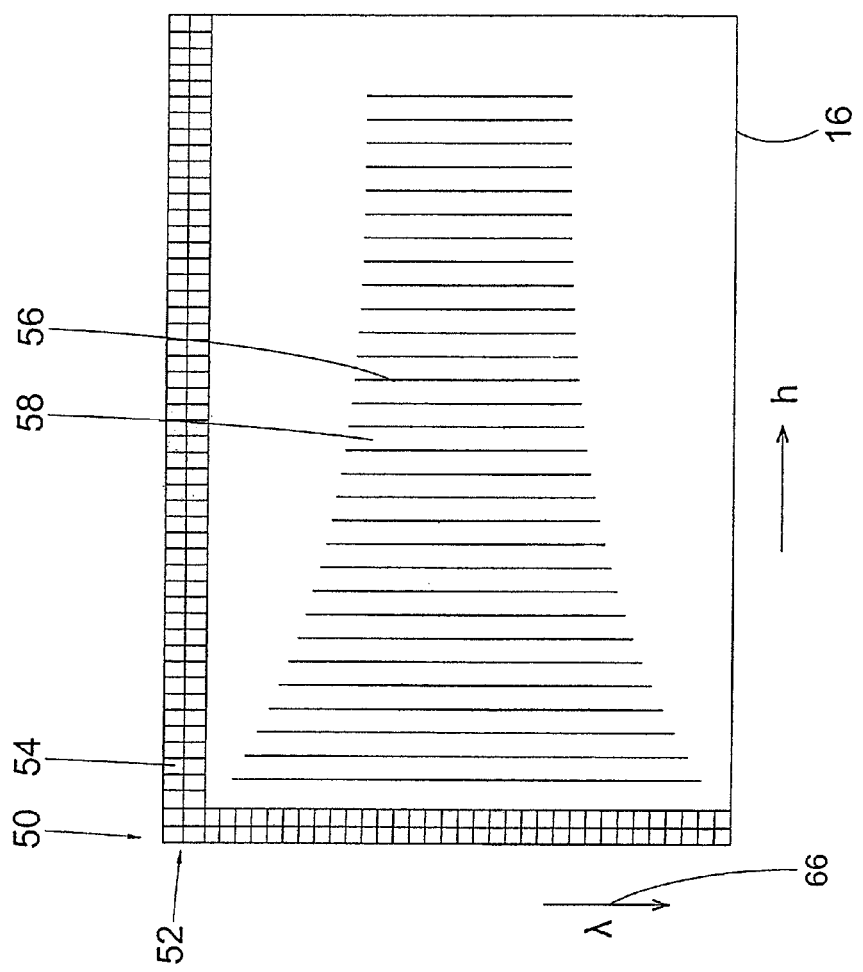
FIG. 2 illustrates a spectrum on a detector.

The detector 16 comprises a plurality of columns 50 and lines 52 with detector elements (pixels) 54 for the detection of radiation incident thereon. Two columns and lines of such a detector 16 are schematically shown in FIG. 2. It is understood, that the representation is not according to scale. A commercially available detector has a size of 30 mm×30 mm and, for example, 4000000 square pixels with a width of 15 microns corresponding to the width of the slit 12.

A plurality of adjacent orders with about the same distances therebetween is generated in the shown assembly due to the lateral dispersion and the predispersion. The orders denoted with numeral 56 are essentially parallel on the detector 16, as is indicated in FIG. 2. A space 58 which is not illuminated is present between the orders 56. The wavelength λ increases in the downward direction 66 corresponding to the dispersion of the Echelle grating 34 (main dispersion direction). The orders n increase towards the right according to the superposition of the predispersion of the plane grating 20 and the lateral dispersion of the prism 38. Accordingly, the short wavelength spectral range in high order is on the right side of the detector.

The distance 58 between the orders results from the superposition of the predispersion and the lateral dispersion. The dispersion of typical prism materials, such as quartz or calcium fluoride, strongly increases with decreasing wavelength especially in the UV range. Without further measures the orders are widely separated in the short wavelength range while the orders in the long wavelength range are close together as it is the case in DE 10 2004 028 001 described above.

The angular dispersion of a diffraction grating is about constant with small diffraction angles.

As the free spectral range for the individual orders of an Echelle grating increases proportional to the square of the wavelength, the distance between adjacent orders also increases with the use of a grating for the separation of the orders with increasing wavelengths.

The line number of the grating 20 is selected in such a way that the effects of the grating predispersion and the prism lateral dispersion on the uneven separation of the orders are just about compensated in the considered wavelength range which is in the present embodiment between 190 nm and 860 nm. With the two-step assembly for separating the orders an essentially constant distance between the orders is achieved. The overall dispersion resulting from the lateral—and the predispersion is selected in such a way that the not illuminated dark spaces between the orders is always larger than one detector pixel and thereby real intensity minima are obtained between the orders. However, it is not selected much larger in order to be able to image all orders onto a commercially available detector.

Figure 3:
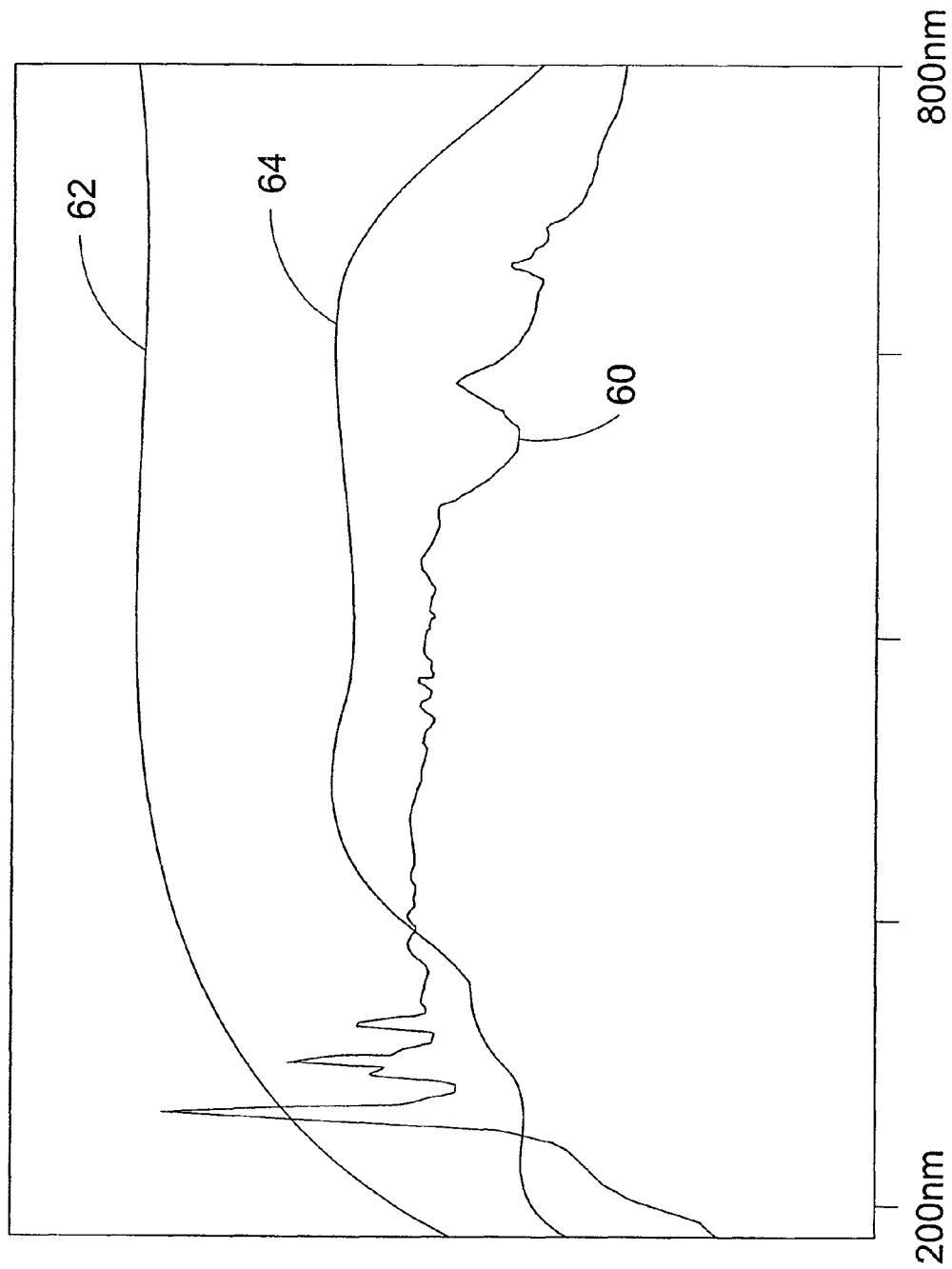
FIG. 3 illustrates the spectral intensity distribution of a typical continuum source, of the sensitivity of a typical detector and the reflectivity of typical mirrors.

FIG. 3 shows the spectral intensity distribution 60 of a Xenon high pressure short arc lamp. It can be recognized that the intensity in the analytically very important range about 200 nm is much smaller than in the range of about 500 nm. The reflectivity 62 of mirrors and the sensitivity 64 of the detector 16 normally is reduced in the short wavelength range also.

The detector elements 54 of the detector 16 are all read out with the same frequency. This means that all detector elements are illuminated with the same illumination time. In order to avoid saturation of strongly illuminated detector elements in the wavelength range of, for example, about 500 nm, before a sufficient signal is generated in the weakly illuminated ranges a grey filter 68 is positioned in the image plane 24 with a spacially spatially varying transmission.

Figure 4:
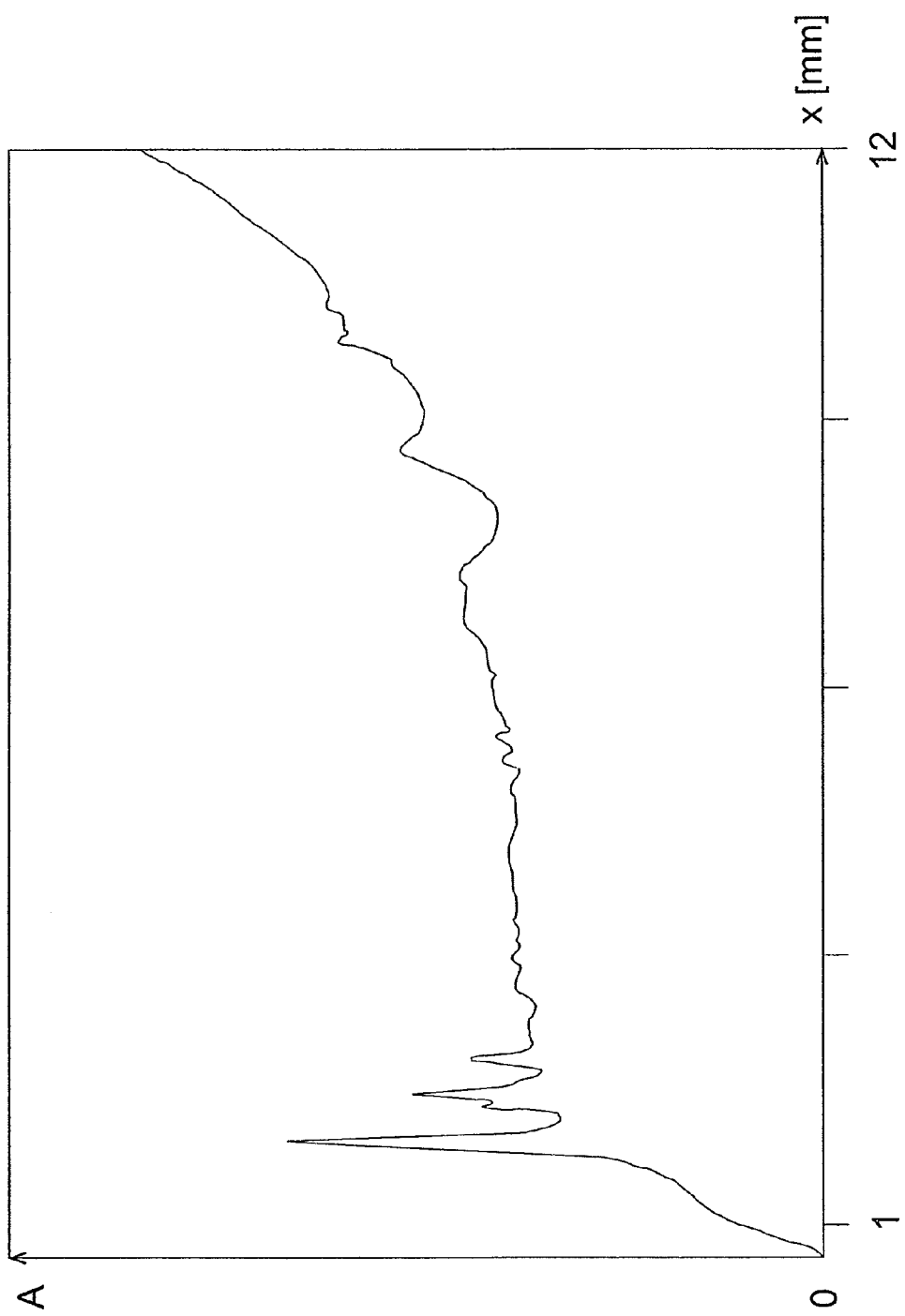
FIG. 4 shows the transmission of a grey filter depending on the spatial position.
Figure 5:
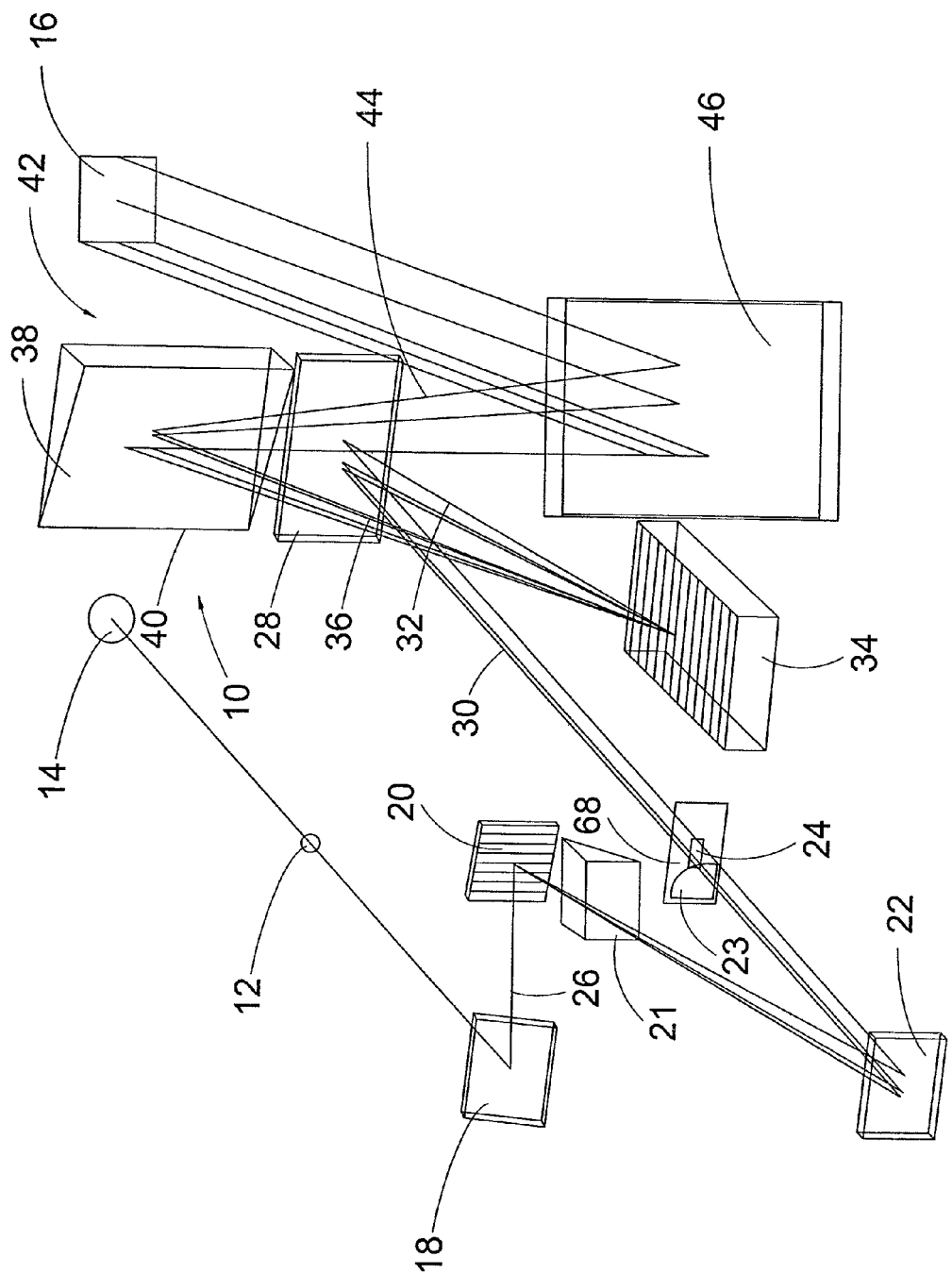
FIG. 5 shows an alternative embodiment of an Echelle spectrometer where a prism with a baffle is used instead of a grey filter.

FIG. 4 is a schematic representation of the grey filter absorption with a varying spacial spatial distribution in the image plane 24. In the left range the filter is completely transparent. In this range the short wavelength range is imaged. In the right range with the long spectral wavelength range the grey filter absorbs to a greater extent. It can be recognized that a very exact manipulation of the spectrum incident on the detector can be achieved by a spatial variable coating of a thin quartz glass window with absorbing material.

The ideal transmission distribution of the grey filter is experimentally determined by illuminating the spectrometer assembly with a continuous radiation source without the filter. An intensity distribution is obtained on the detector along the middles of the orders which results from the reflection—and the transmission losses of the optical components as well as from the quantum sensitivity of the detector and the spectral distribution of the radiation source. From the series of intensity values obtained in such a way the wavelength dependent transmission distribution of the grey filter can be determined. For this purpose each value is divided by the smallest intensity value within the spectrum and then inverted. If a grey filter with such a transmission distribution is used at the position of the additional image plane of the predispersing imaging optical assembly an even intensity spectrum is generated at the detector for this configuration.

Obviously, such a transmission distribution can also be calculated or determined in any other way. The proposed method, however, is particularly simple and exact.

An order filter is used in addition to the spatially resolving grey filter blinding higher orders of the predispersed spectrum in the image plane 24.

The predispersing imaging optical assembly can be designed in such a way that imaging errors of the imaging optical assembly, especially astigmatism, is just about compensated thereby generating an anastigmatic sharp image of the entrance slit in the image plane.

Figure 6:
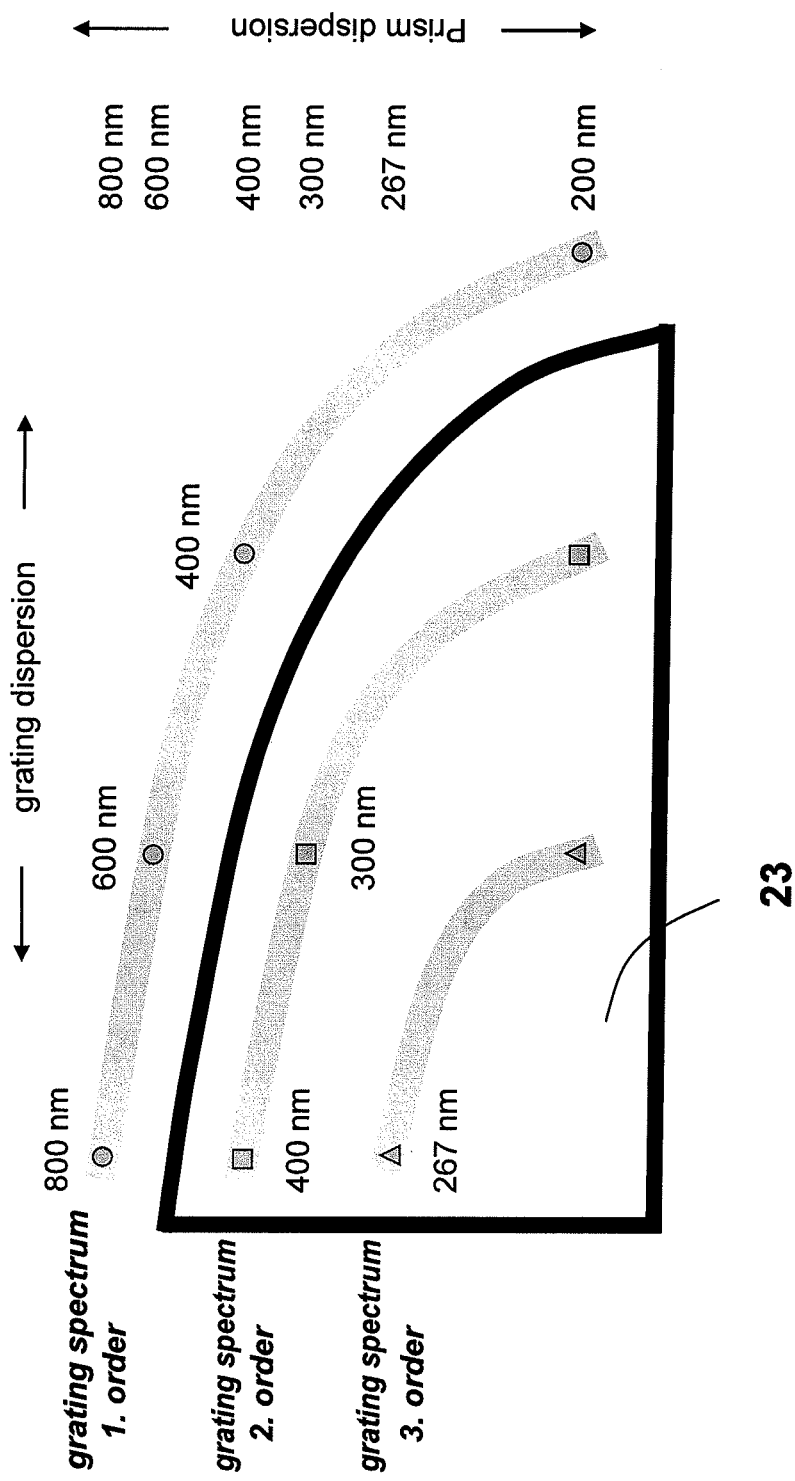
FIG. 6 is a schematic view of an image in the first focus of an assembly according to FIG. 5 with a baffle.

In a further alternative embodiment, a prism 21 is arranged behind the grating 20 in the range of the image plane 24 in the optical path. The prism 21 has only a comparatively weak dispersion in the main dispersion direction of the Echelle grating. The grating spectrum generated by the grating 20 can extend over several orders. With the dispersion of the prism 21 the orders are separated in a direction lateral to the predispersion direction. Unwanted higher orders can be baffled by a simple blind 23. Thereby the wavelengths can be unambiguously related to each position on the detector. The prism 21 combined with the baffle renders the order filter unnecessary. The image 24 generated in the image plane 24 is schematically shown in FIG. 6.

The invention claimed is:

1. An Echelle spectrometer assembly with internal separation of the orders, comprising
   an entrance slit and an image plane for imaging radiation having an intensity entering through said entrance slit on said image plane,
   an Echelle grating for the spectral separation of radiation in a main dispersion direction in a plurality of orders,
   a dispersing element for the separation of said plurality of orders by means of the spectral separation of the radiation in a lateral dispersion direction forming an angle with said main dispersion direction of said Echelle grating such that a two-dimensional spectrum with a plurality of separated orders is generated,
   an imaging optical assembly for imaging said radiation entering into said Echelle spectrometer assembly through said entrance slit into said image plane, and
   a detector having a two-dimensional arrangement of a plurality of detector elements in said image plane, and
   predispersion means for predispersion of radiation in the direction of said lateral dispersion of said dispersing element,
   and wherein
   said predispersion means comprise a predispersing element, which is arranged along the optical path behind the entrance slit inside the spectrometer assembly,
   said imaging optical assembly is designed in such a way that said predispersed radiation is imaged into an additional image plane with a spatial and a spectral radiation density the image plane being free of mechanical limitations and being arranged along the optical path between said predispersing element and said Echelle grating, and
   optical means are provided in said additional image plane with said predispersed spectrum for manipulating said spatial and/or spectral radiation density distribution at said detector.

2. An Echelle spectrometer assembly according to claim 1, wherein means are provided for spacially resolved reduction of said intensity of said predispersed radiation in said additional image plane.

3. An Echelle spectrometer assembly according to claim 2, wherein said means for reduction of said intensity of said predispersed radiation are formed by a grey filter having a spatially variable transmission in said additional image plane.

4. An Echelle spectrometer assembly according to claim 2, wherein said imaging optical assembly, said Echelle grating and said dispersing elements have a reflectivity or a transmissivity with a spectral distribution, a radiation source with a spectral distribution of its emitted intensity is provided and said detector has a quantum effectivity with a spectral distribution and wherein said reduction of said intensity is adapted to said spectral distribution of said transmission and said reflectivity of said imaging optical assembly, said Echelle grating, said dispersing elements, said spectral distribution of said intensity of a radiation source and/or said spectral distribution of said quantum effectivity of said detector in such a way that said intensity spectrum generated by said radiation source on said detector is essentially even.

5. An Echelle spectrometer assembly according to claim 1, wherein said predispersing element is a grating with a grating line number.

6. An Echelle spectrometer assembly according to claim 5, wherein said dispersing element is a prism and said grating line number of said predispersing grating is adapted to said dispersion of said prism in such a way that said orders imaged onto said detector appear essentially with even distances.

7. An Echelle spectrometer assembly according to claim 1, wherein an order filter is positioned in said additional image plane.

8. An Echelle spectrometer assembly according to any of claims 5, wherein said predispersing means comprise an additional prism with a prism dispersion, the prism having a roof edge which is positioned in such a way that said prism dispersion runs parallel to said main dispersion direction of said Echelle grating and said predispersing means comprise a baffle for suppressing higher orders of said predispersing grating.

9. An Echelle spectrometer assembly according to claim 1, wherein a radiation source with a continuous spectrum between 190 nm and 860 nm is provided, especially a Xe-high pressure short arc lamp.

10. An Echelle spectrometer assembly according to claim 1, further comprising an order filter for suppressing higher orders of said predispersing grating in said image plane.

11. An Echelle spectrometer assembly according to claim 1, wherein said imaging optical assembly is designed in such a way that an astigmatic image can be generated in said additional image plane which is compensated by further optical components of said imaging optical assembly just in such a way that an astigmatic, precise image is generated in said image plane at said detector.

12. A method for the measurement and detection of spectra in an atomic absorption spectrometer having spectral measurement and detection components thereof, comprising the step of providing an Echelle spectrometer assembly according to claim 1 as the spectral measurement and detection components in the atomic absorption spectrometer.

13. A method for the measurement of spectra in an optical emission spectrometer having spectral measurement and detection components thereof, comprising the step of providing an Echelle spectrometer assembly according to claim 1 as the spectral measurement and detection components in the optical emission spectrometer.

* * * * *